US012071793B2

(12) United States Patent
Lemley et al.

(10) Patent No.: US 12,071,793 B2
(45) **Date of Patent: *Aug. 27, 2024**

(54) DUAL LOCK LOCKING SYSTEM FOR CONTAINERS

(71) Applicant: WILLIAMS SCOTSMAN, INC., Baltimore, MD (US)

(72) Inventors: Russ Lemley, Phoenix, AZ (US); Jon Keating, Phoenix, AZ (US)

(73) Assignee: WILLIAMS SCOTSMAN, INC., Baltimore, MD (US)

( * ) Notice: Subject to any disclaimer, the term of this patent is extended or adjusted under 35 U.S.C. 154(b) by 888 days.

This patent is subject to a terminal disclaimer.

(21) Appl. No.: 16/999,896

(22) Filed: Aug. 21, 2020

(65) Prior Publication Data

US 2021/0102416 A1 Apr. 8, 2021

Related U.S. Application Data

(63) Continuation of application No. 14/602,608, filed on Jan. 22, 2015, now Pat. No. 10,767,399, which is a (Continued)

(51) Int. Cl.
*E05B 83/02* (2014.01)
*E05B 65/00* (2006.01)
(Continued)

(52) U.S. Cl.
CPC .......... *E05B 83/02* (2013.01); *E05B 65/0003* (2013.01); *E05B 67/38* (2013.01);
(Continued)

(58) Field of Classification Search
CPC ... E05C 1/004; E05C 1/06; E05C 9/06; E05C 9/063; E05C 9/16; E05C 9/20; E05C 9/24;
(Continued)

(56) References Cited

U.S. PATENT DOCUMENTS

| | | | | |
|---|---|---|---|---|
| 1,870,746 A * | 8/1932 | Edwards | E05B 65/0075 | 137/512.1 |
| 3,088,548 A * | 5/1963 | Behrens | E05C 9/06 | 187/331 |

(Continued)

*Primary Examiner* — Kristina R Fulton
*Assistant Examiner* — Emily G. Brown
(74) *Attorney, Agent, or Firm* — Foley & Lardner LLP

(57) ABSTRACT

A locking system is mounted to a door with three rods extending therefrom. The rods have a locked position extending beyond the periphery of the door and an unlocked position not extending beyond the periphery of the door. Three rod receivers are adapted to receive the three rods in the locked position. A handle rotatably engages cam plates which are operatively engaged with the rods whereby rotation of the handle rotates the cam which moves the rod ends from one position to the other. A locking tab extends forwardly from the lower cam plate into a recess and is engaged by a circular lock while the recess prevents movement of the engaged circular lock. A second locking tab extends forwardly from the rod-locking link and a stationary locking tab is aligned thereto. Both locking tabs are engaged by a padlock preventing movement of the rod-locking link.

21 Claims, 11 Drawing Sheets

Related U.S. Application Data continuation of application No. 13/159,246, filed on Jun. 13, 2011, now Pat. No. 8,960,731, which is a continuation of application No. 11/417,724, filed on May 4, 2006, now Pat. No. 7,997,630.

(51) Int. Cl.
*E05B 67/38* (2006.01)
*E05C 1/12* (2006.01)
*E05C 7/04* (2006.01)

(52) U.S. Cl.
CPC ................ *E05C 1/12* (2013.01); *E05C 7/045* (2013.01); *Y10T 70/5155* (2015.04); *Y10T 292/0801* (2015.04); *Y10T 292/0806* (2015.04); *Y10T 292/0839* (2015.04); *Y10T 292/084* (2015.04); *Y10T 292/0964* (2015.04); *Y10T 292/1016* (2015.04)

(58) Field of Classification Search
CPC ........ E05C 7/045; E05C 1/12; Y10T 70/5155; Y10T 292/0834; Y10T 292/0836; Y10T 292/0837; Y10T 292/0838; Y10T 292/0841; Y10T 292/0844; Y10T 292/0846; Y10T 292/1017; Y10T 292/0892; Y10T 292/089; Y10T 292/0961; Y10T 292/0963; Y10T 292/0964; Y10T 292/0967; Y10T 292/0992; Y10T 292/1015; Y10T 292/1016; Y10T 292/102; Y10T 292/0801; Y10T 292/0806; Y10T 292/0839; E05B 83/02; E05B 65/0003; E05B 67/38
USPC ......... 292/3, 7, 32–38, 40, 68, 66, 156, 158, 292/159, 161, 139, 42, 171, 140, 141, 292/143, 72, 175, 145; 70/91, 113, 118, 70/54, 56, 121
See application file for complete search history.

(56) References Cited

U.S. PATENT DOCUMENTS

| | | | | | |
|---|---|---|---|---|---|
| 3,333,878 | A | | 8/1967 | Pelcin | |
| 4,046,410 | A | | 9/1977 | Connell | |
| 4,130,306 | A | | 12/1978 | Brkic | |
| 4,742,701 | A | | 5/1988 | Scavetto | |
| 5,029,909 | A | * | 7/1991 | Bunger | E05B 67/383 70/48 |
| 5,261,258 | A | | 11/1993 | Bunger | |
| 5,509,700 | A | * | 4/1996 | Kennedy, Jr. | E05B 17/0058 292/DIG. 32 |
| 5,511,835 | A | | 4/1996 | Hardee | |
| 5,697,234 | A | * | 12/1997 | Lozier | E05B 65/0075 70/120 |
| 6,065,314 | A | * | 5/2000 | Nicholson | E05B 67/383 70/56 |
| 6,357,806 | B1 | | 3/2002 | Saku | |
| 6,364,383 | B1 | | 4/2002 | Shen | |
| 6,592,155 | B1 | * | 7/2003 | Lemley | E05C 9/06 292/7 |
| 6,679,087 | B2 | | 1/2004 | Suggs et al. | |
| 6,729,701 | B2 | | 5/2004 | Carter et al. | |
| 6,843,084 | B2 | * | 1/2005 | Porter | E05B 47/0603 292/DIG. 31 |
| 7,997,630 | B2 | | 8/2011 | Lemley et al. | |
| 8,011,213 | B1 | * | 9/2011 | Gogel | E05B 83/10 292/259 R |
| 8,960,731 | B2 | | 2/2015 | Lemley et al. | |
| 2002/0178767 | A1 | * | 12/2002 | Lemley | E05C 9/16 70/56 |
| 2006/0201210 | A1 | | 9/2006 | Gogel | |
| 2007/0262588 | A1 | | 11/2007 | Lemley et al. | |
| 2012/0118028 | A1 | | 5/2012 | Lemley et al. | |

* cited by examiner

DUAL LOCK LOCKING SYSTEM FOR CONTAINERS

TECHNICAL FIELD

This invention relates to an improved locking system for containers, in particular, for storage containers.

BACKGROUND OF THE INVENTION

Although the prior art shows locking systems for containers, none are believed to illustrate the type of device disclosed and claimed.

Storage containers referred to in the present specification are generally large, walk in boxes similar in size to semi-trailer trucks. The containers can be stacked and shipped by rail and by ship easily. In addition, such containers are used as storage devices by end users.

With any such container, maintaining security for the contents is a prime concern. Because such containers are often left unattended, they become targets for thieves and other criminals. Thus, the manufacturers and users of such containers continue to seek and develop better security techniques while the criminal element continues to develop methods for attacking and circumventing those security measures.

In addition, some storage applications require a seal around the doors to prevent entry of water, insects and other environmental elements. For example, paper and furniture storage is best served by a sealed container.

Various types of locking systems have been described in the prior art.

U.S. Pat. No. 5,029,909 entitled "Door Lock Assembly" which issued on Jul. 9, 1991 owned by assignee of the present invention discloses a protective device for locking the doors of a storage container using a two bar configuration.

U.S. Pat. No. 5,261,258 entitled "Padlock Protector" which issued on Nov. 16, 1993 owned by assignee of the present invention discloses a security device, which consists of an exterior mounted housing for a latch bar, which defines a recess. The recess provides access to an aperture in the bar by a circular shackle of a disk shaped padlock. This device operates in much the same fashion as the present invention. However, it is also believed to be less effective because of its exterior mounting and structure allows some access to the locking mechanism and the shaft by drills and hammer devices.

U.S. Pat. No. 5,509,700 entitled "Latch and Lock for Trailer Doors" which issued on Apr. 23, 1996 to Kennedy, Jr., and owned by assignee of the present invention, discloses a concealed latch with an arm attached to a pivot operatively connected to a pair of locking bars.

However, the devices of the prior art described above are not completely satisfactory. For example, such devices often require a great deal of effort to close and latch. In one system, the user is required to bend over and operate the lever system in a particular sequence. In addition, the devices are often difficult to operate if the container is not level. Further, these devices often provide only one locking mechanism making it possible, once the locking system has been circumvented, for thieves and other criminals to gain entry to the storage container.

Thus there is a need for a door locking system that is simple to operate, provides the necessary sealing action and provides a second locking mechanism that would require additional time to circumvent. The present invention meets this need.

None of the known prior art disclose the device set forth herein.

SUMMARY OF THE INVENTION

It is an object of this invention to provide an improved locking system for storage containers which provides additional security therefore.

It is a further object of this invention to provide an improved locking system for storage containers which provides a tight seal against the elements therefore.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
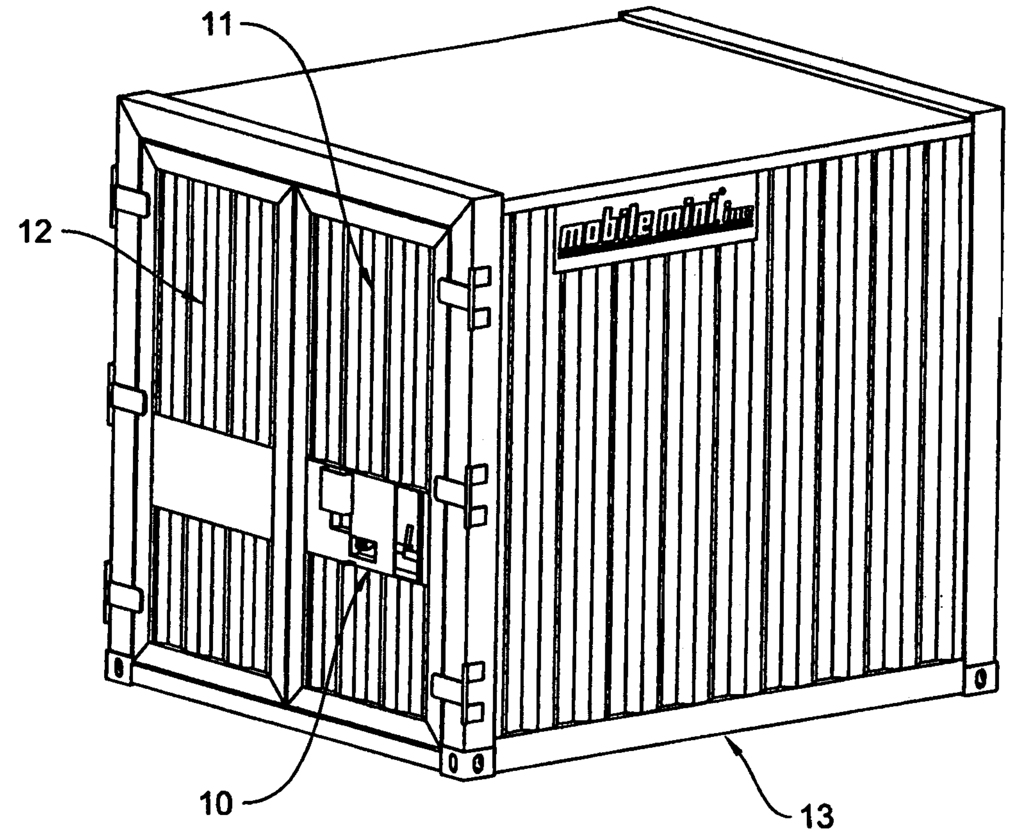
FIG. 1 is a perspective front and side view of a storage container embodying the present invention.
Figure 2:
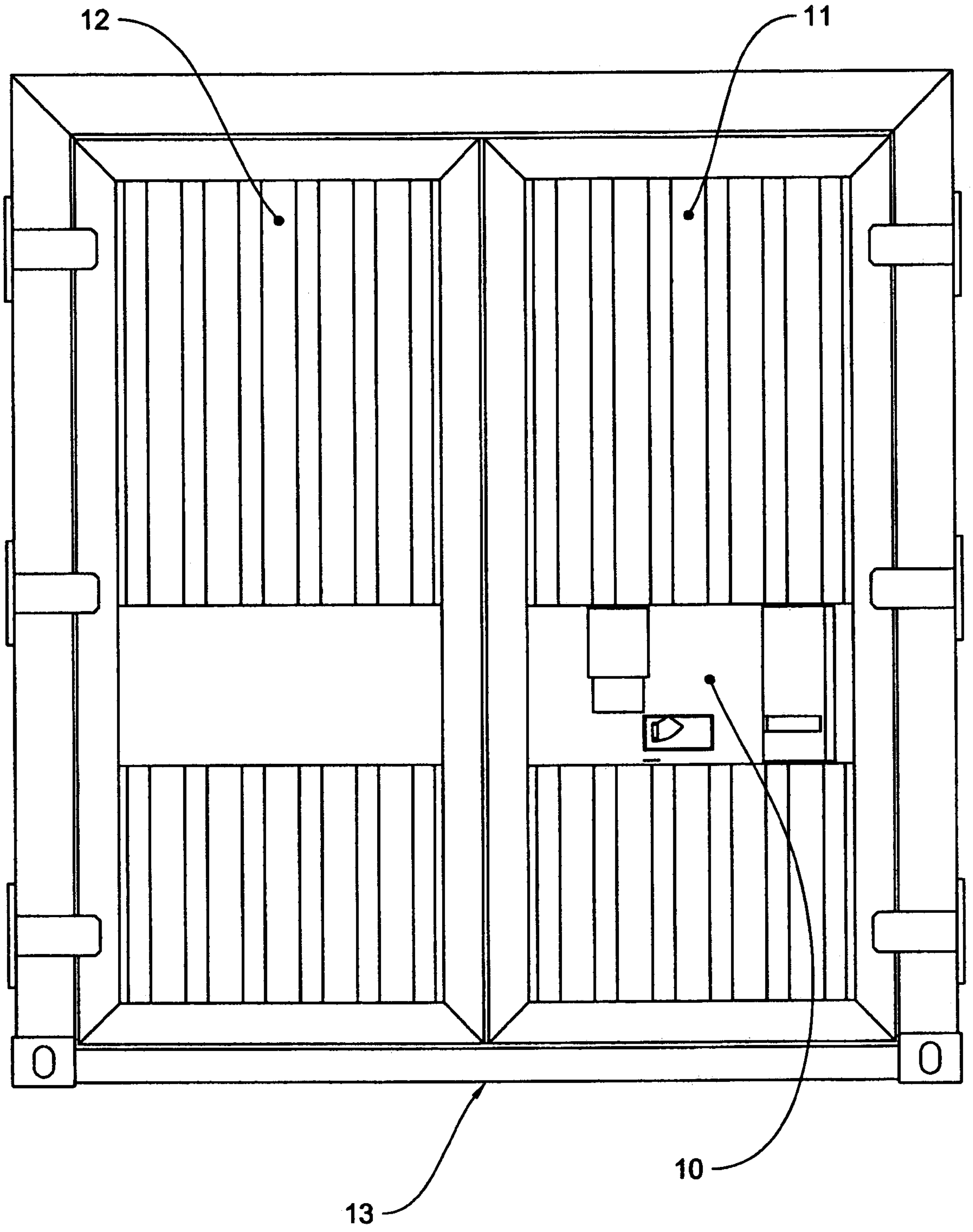
FIG. 2 is a front view of the embodiment of FIG. 1.

Referring more particularly to the drawings by characters of reference, FIGS. 1-11 disclose one embodiment of an improved locking system 10 mounted to one door 11 of a cargo storing container 13 or other door assembly and the floor thereof. Door 11 and its companion door 12 overlap and open outwardly with door 12 being closed first and door 11 being closed thereafter. The operation of such doors 11 and 12 are well known to those of ordinary skill in the art and will not be further discussed herein. Note that some doors 11 and 12 do not overlap. In that event, tabs must be added to door 12 to create an appropriate overlap for locking system 10 to function properly.

Figure 3:
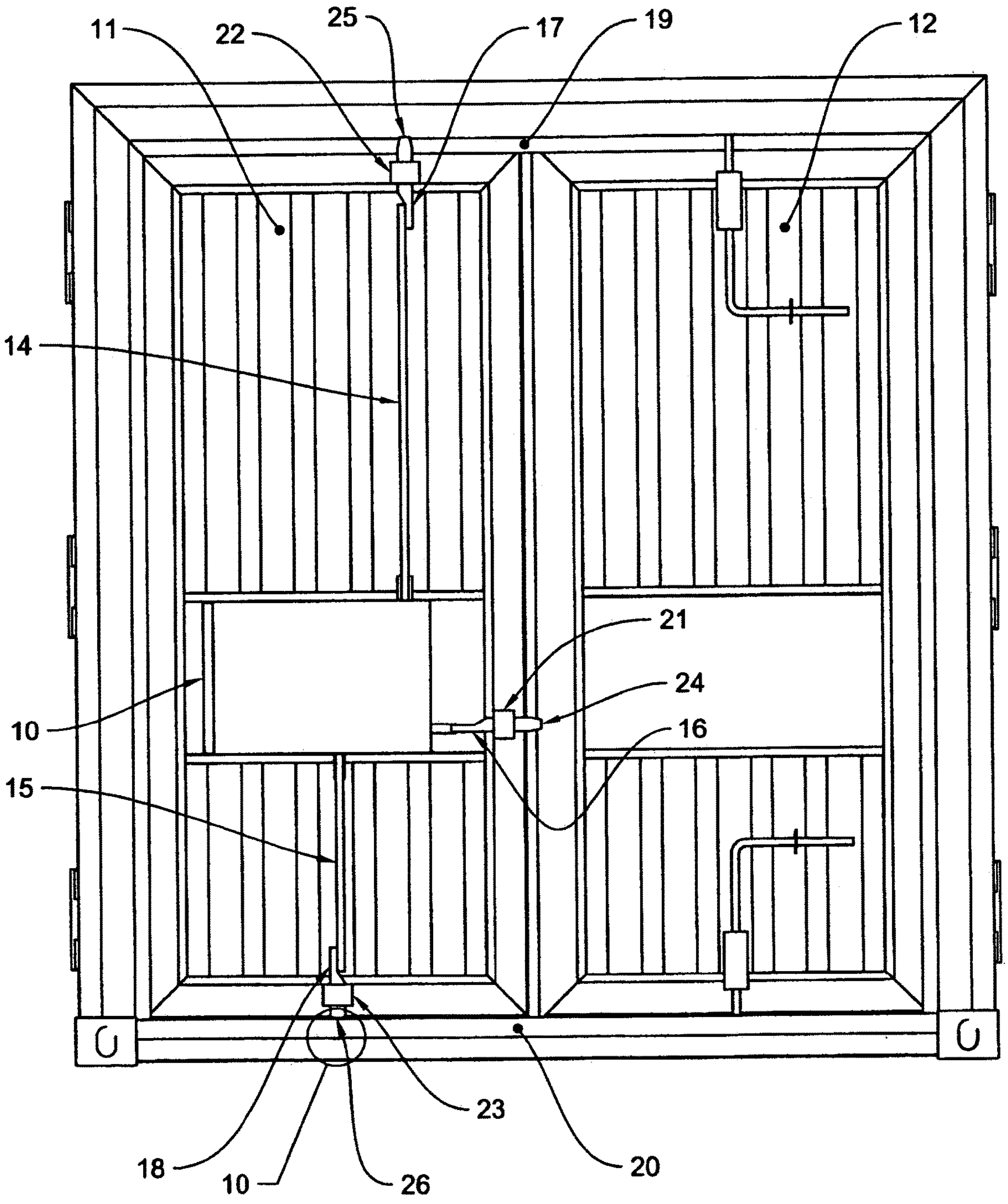
FIG. 3 is a rear view of the embodiment of FIG. 1 in a locked position.
Figure 4:
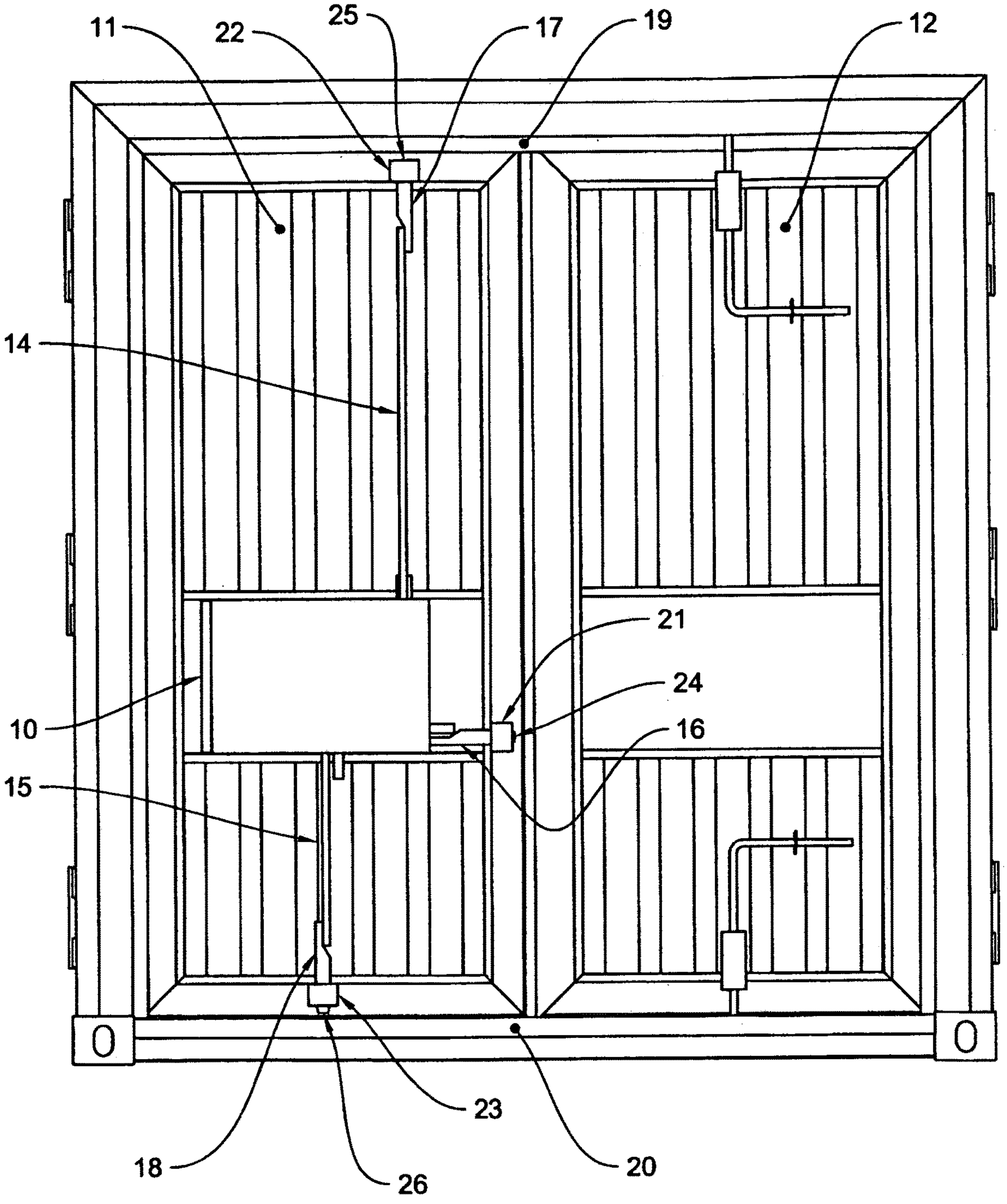
FIG. 4 is a rear view of the embodiment of FIG. 1 in an unlocked position.

As best seen in FIGS. 3 and 4, locking system 10 operatively engages a top rod 14 extending upwardly therefrom, a bottom rod 15 extending downwardly therefrom and a side lock rod end 16. Rods 14 and 15 and lock rod end 16 are mounted on the interior side of door 11. Rod 14 engages the upper lock rod end 17 and rod 15 engages the lower lock rod end 18. Lock rod ends 16, 17 and 18 have a locked position illustrated in FIG. 3 wherein the lock rod ends extend just beyond the periphery of door 11 to engage the interior side of door 12, a ceiling 19 and a floor 20, respectively, and an unlocked position illustrated in FIG. 4 wherein the lock rod ends 16, 17 and 18 do not extend beyond the periphery of door 11. Locking system 10 slides rods 14 and 15 and lock rod end 16 between the two positions as desired. To open system 10, lock rod ends 16, 17 and 18 must be disengaged.

To align lock rod ends 16, 17 and 18, a side lock rod guide 21, a top rod guide 22 and a bottom rod guide 23 and are provided mounted on door 11 proximate to the periphery thereof. Lock rod ends 16, 17 and 18 preferably engage a side lock rod guide 21, a ceiling lock rod guide 22 and a floor lock rod guide 23.

Preferably, each lock rod end 16, 17 and 18 include a sloped edge 24, 25 and 26, respectively, which facilitate alignment of each lock rod end with a respective lock rod guide 21, 22, 23. In addition, preferably, lock rod ends 16, 17 and 18 are doubled in thickness at the distal end thereof. The extra thickness provides further security by strengthening an inherent access point where lock rod ends 16, 17 and 18 cross the periphery of door 11, i.e. where thieves often employ cutting tools. In the presently preferred embodiment, the rods are comprised of solid square steel bar and the lock rod ends are cast as a single piece or may be manufactured by welding two square bars together.

Figure 5:
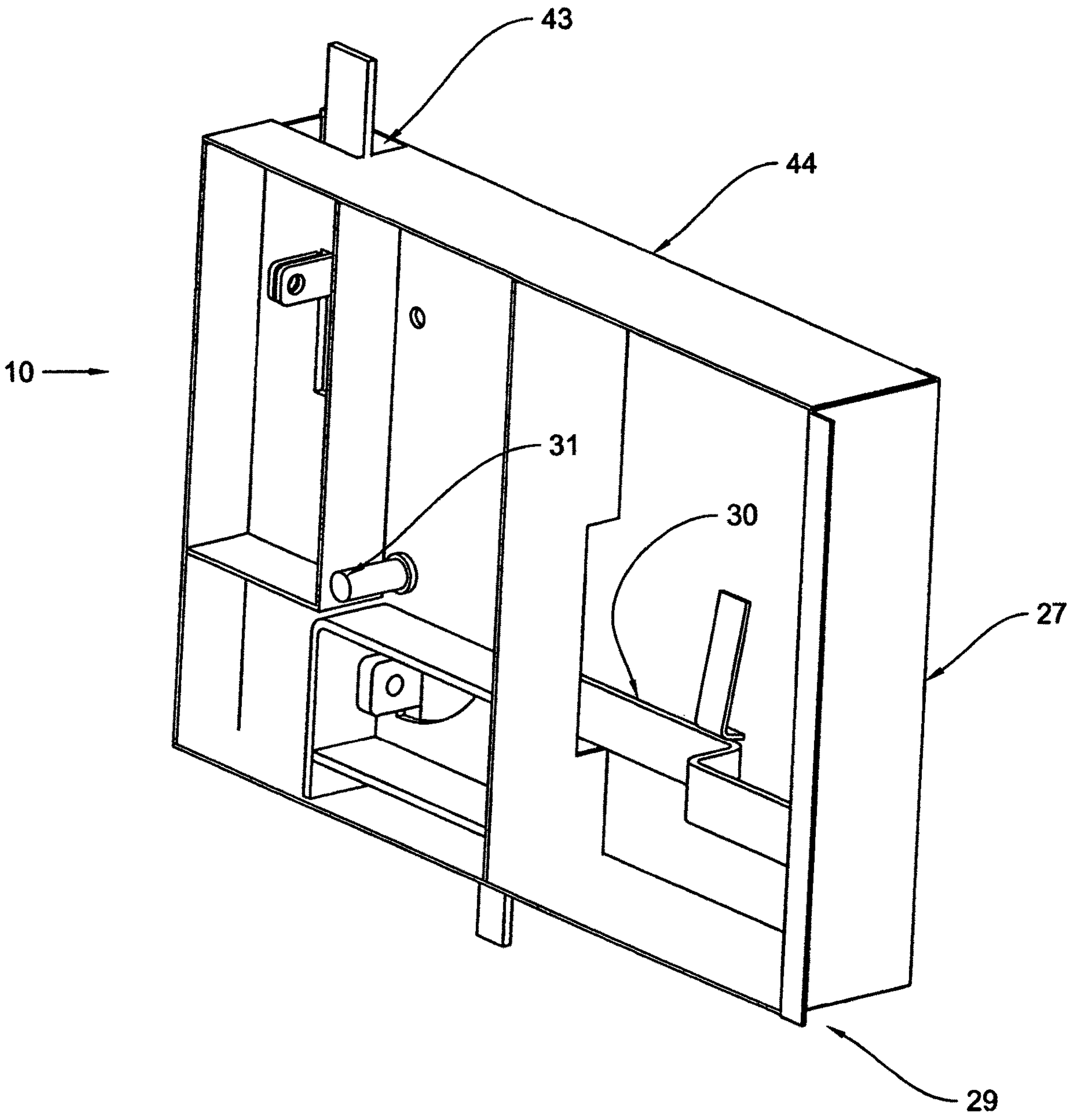
FIG. 5 is a close up perspective view of the present invention.

Turning now to FIGS. 5-8, the operation of locking system 10 is further detailed. As seen in FIG. 5, locking system 10 includes a box like housing 27 having a front panel 28. Front panel 28 includes an integral flange 29 extending outwardly from housing 27, which provides for mounting said housing on an opening in door 11. Housing 27 and integral flange 29 are, preferably, made from heavy gauge metal. For those storage containers 13 made of aluminum or a like material, locking system 10 is secured to door 11 by bolts extending through flange 29 which are secured to door 11 by nuts which are, most preferably, welded to the bolts for security.

A handle 30 rotatably engages an axle 31 extending through front panel 28. One feature of the present invention is to utilize a relatively short handle 30 to minimize the prying leverage available to a potential thief. In the most preferred embodiment, locking system 10 is positioned on door 11 whereby handle 30 is at a height convenient for users in a normal standing position.

Another ergonomic feature is that the direction of rotation of handle 30 to close door 11 is, preferably, a downward motion. Such a downward motion affords a user the ability to bear down on handle 30 with their entire body weight to assure engagement of lock rod ends 16, 17 and 18.

Further, in the presently preferred embodiment, the lock rods 14 and 15 and the lock rod ends 16, 17 and 18 are designed and weighted to fall to the open position thereby preventing doors 11 and 12 from accidentally locking a person inside, and further allowing operation of same with a minimum of force.

Figure 6:
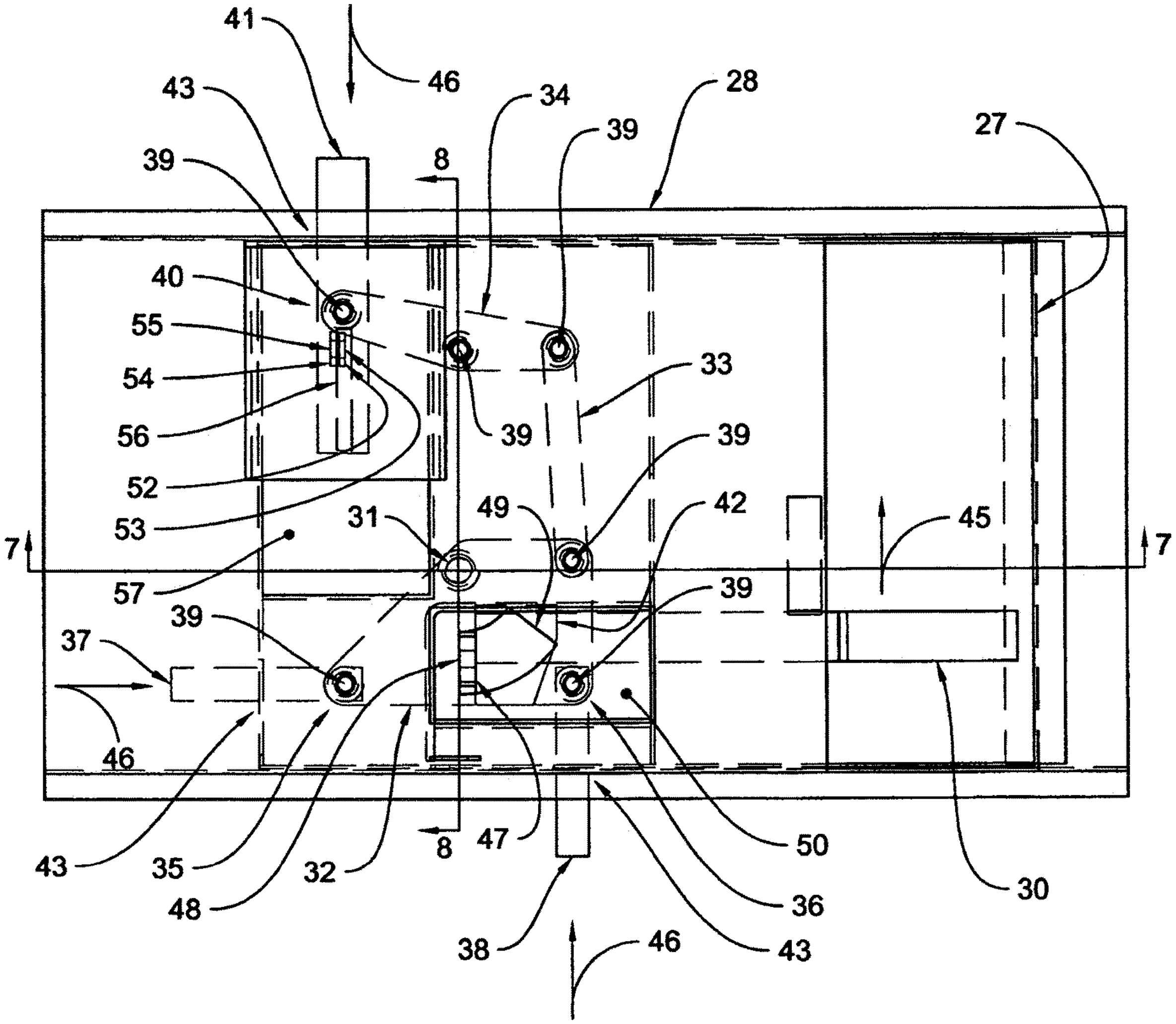
FIG. 6 is a cross sectional front view of the embodiment of FIG. 5.
Figure 7:
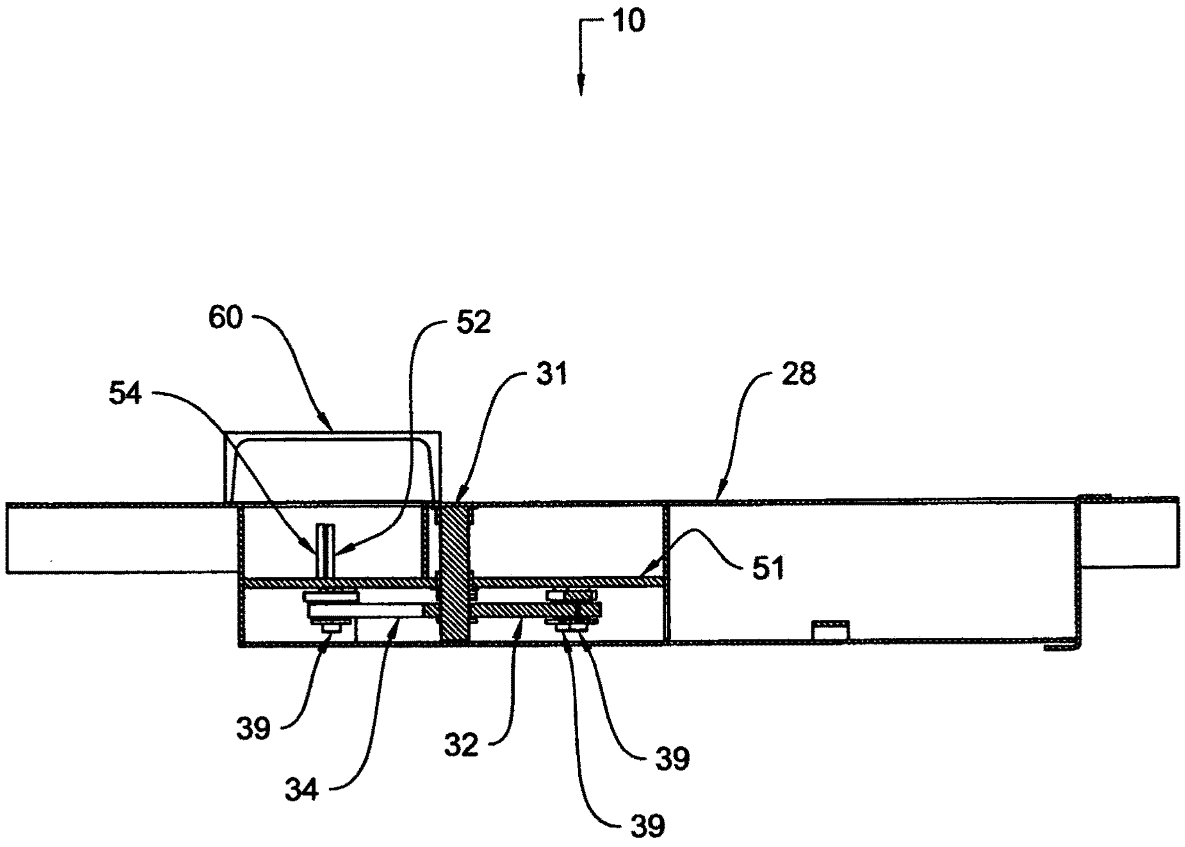
FIG. 7 is a cross sectional view taken along line 7-7 in FIG. 6.
Figure 8:
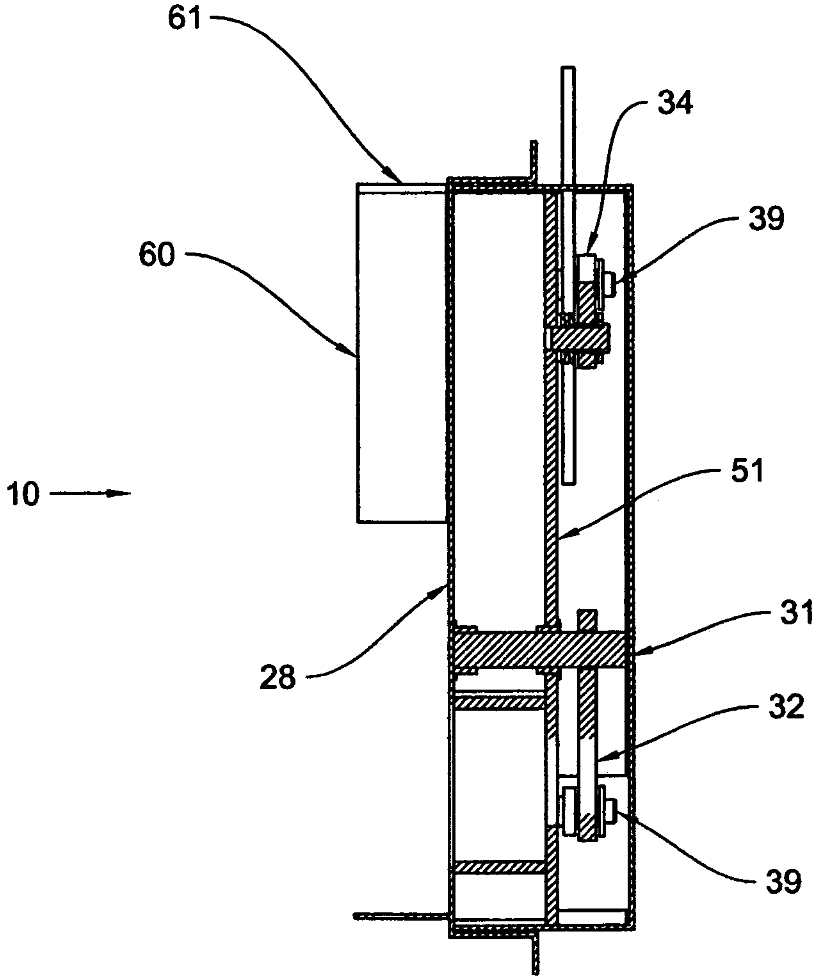
FIG. 8 is a cross sectional view taken along line 8-8 in FIG. 6.

As best seen in FIG. 6, axle 31 operatively engages a lower cam plate 32 mounted within housing 27, which extends laterally therefrom. In the illustrated embodiment, lower cam plate 32 is trapezoidal though those skilled in the art will recognize that the particular shape is not important.

The lower cam plate 32 engages cam link 33. Cam link 33 engages upper cam plate 34. This establishes an operative link between handle 30, axle 31, lower cam plate 32, cam link 33 and upper cam plate 34.

At two corners 35 and 36 of lower cam plate 32 a side rod link 37 and bottom rod link 38, respectively, are mounted, preferably by bushing 39. Additionally, at corner 40 of upper cam plate 34 a top rod-locking link 41 is mounted, preferably by bushing 39. The use of rod links 37, 38 and 41 permits the user to adjust the length of the rod/link combination to compensate for dimensional variations in storage containers.

Further, lower cam plate 32 includes an anti-torque spacer 42 which maintains lower cam plate 32 in parallel alignment to housing 27 even if excessive force is applied to lower cam plate 32 via axle 31 and handle 30. Anti-torque spacer 42 also restricts the entry of outside elements into housing 27.

As best seen in FIG. 5, rod links 37 and 38 and rod-locking link 41 extend through openings 43 in sidewalls 44 of housing 27. In the presently preferred embodiment, rod links 37 and 38 and rod-locking link 41 are all comprised of steel flat bar and are joined via welding to lock rods 14 and 15 and lock rod end 16. Those skilled in the art will recognize the suitability of other materials for the use described herein.

In FIG. 6, locking system 10 is shown in the locked position. To unlock, a user rotates handle 30, and hence lower cam plate 32, via axle 31, which rotates upper cam plate 34 via cam link 33, counter clockwise as shown by arrow 45 wherein rod links 37 and 38 and rod-locking link 41 are pulled inwardly into housing 27 as shown by arrows 46 thereby retracting lock rods 14 and 15 and lock rod end 16 to the unlocked position.

A further advantage of locking system 10 is that retraction of rod links 37 and 38 and rod-locking link 41 into housing 27 affords installation of locking system 10 onto doors 11 and 12 through the opening, which is cut into the front of door 11. Such a construction assists in installation since housing 27 is a one-piece installation.

Extending forwardly from lower cam plate 32 is a single piece, thick locking tab 47 having a lock hole 48 extending therethrough. Tab 47 extends through an arcuate gap 49 into a recess 50 extending inwardly from front plate 28 to center plate 51 parallel to front plate 28. Tab 47 passes through a slot in lower cam plate 32 and is welded to the back of lower cam plate 32. The ends of arcuate gap 49 provide stops, which limit the travel of tab 47, and hence cam plates 32 and 34, thereby providing the end points for the locked and unlocked positions.

Additionally, a secondary lock tab 52 extends forwardly from rod-locking link 41 having a lock hole 53 extending therethrough. Lock tab 52 extends through a slot 56 in center plate 51 into a recess 57 extending inwardly from front plate 28 to center plate 51 and is welded to the face of rod-locking link 41. A stationary lock tab 54, having a lock hole 55 extending therethrough is welded to the face of center plate 51 in recess 57 where lock hole 55 is aligned with lock hole 53 in lock tab 52 with locking system 10 in the locked position.

Figure 9:
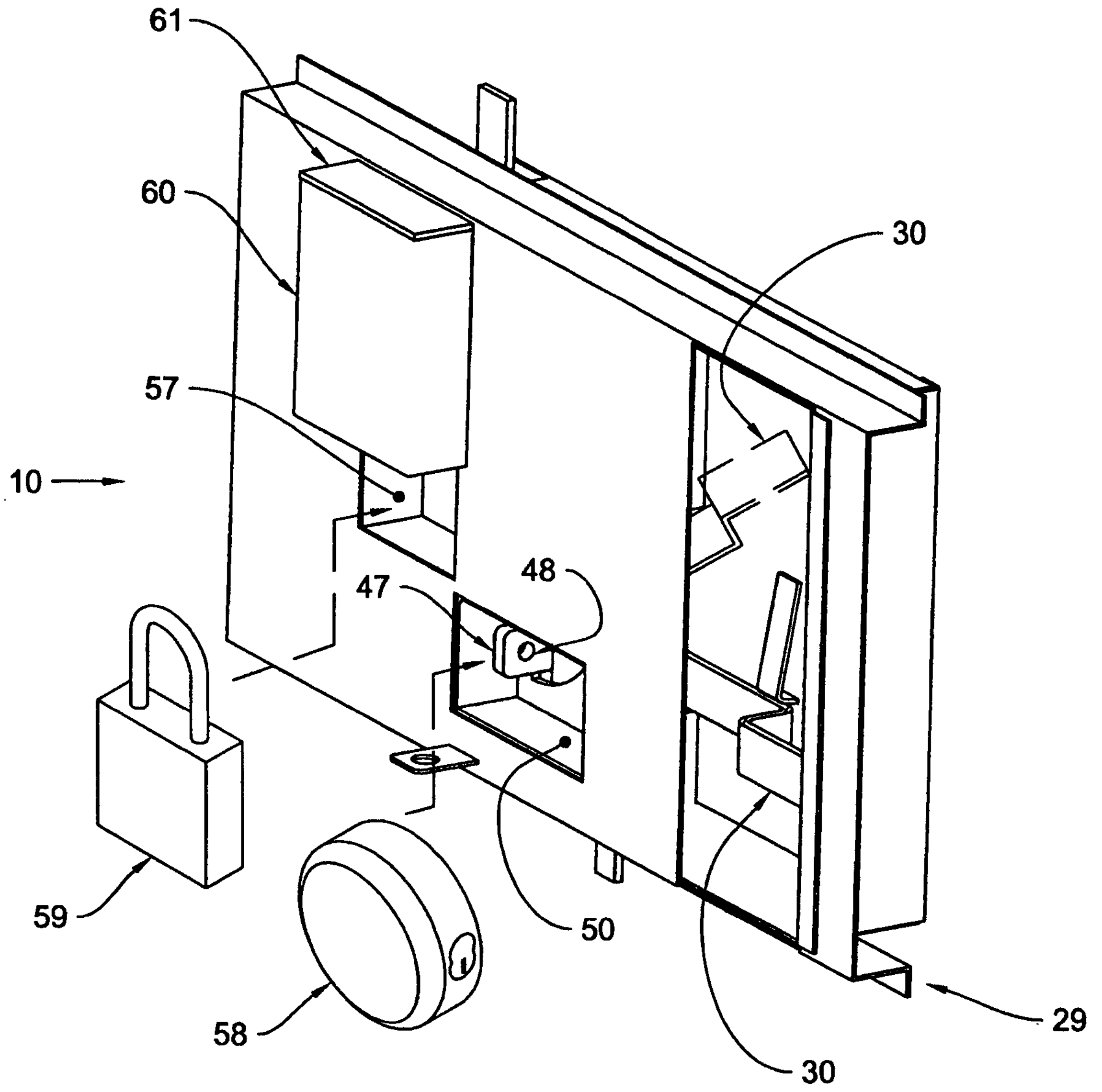
FIG. 9 is a close up perspective view of the present invention showing the use of a padlock and circular lock therewith.
Figure 10:
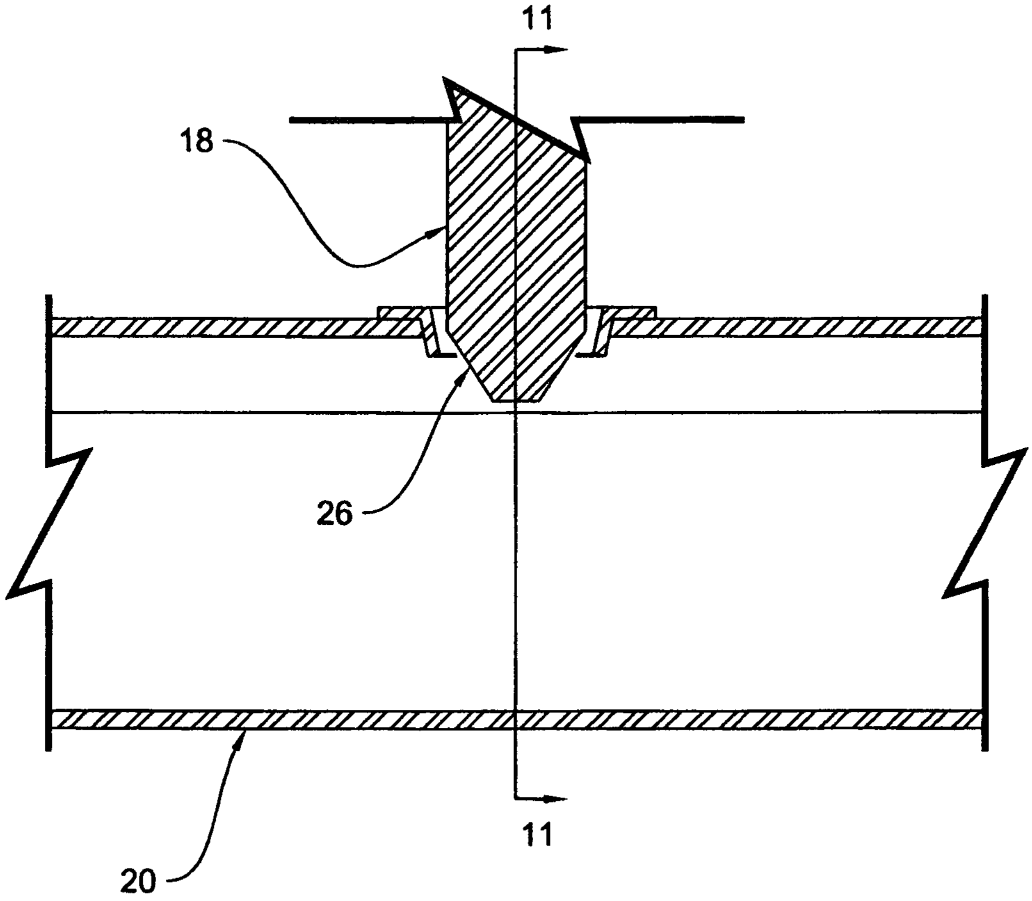
FIG. 10 is a close up view of the circled area 10 in FIG. 3.
Figure 11:
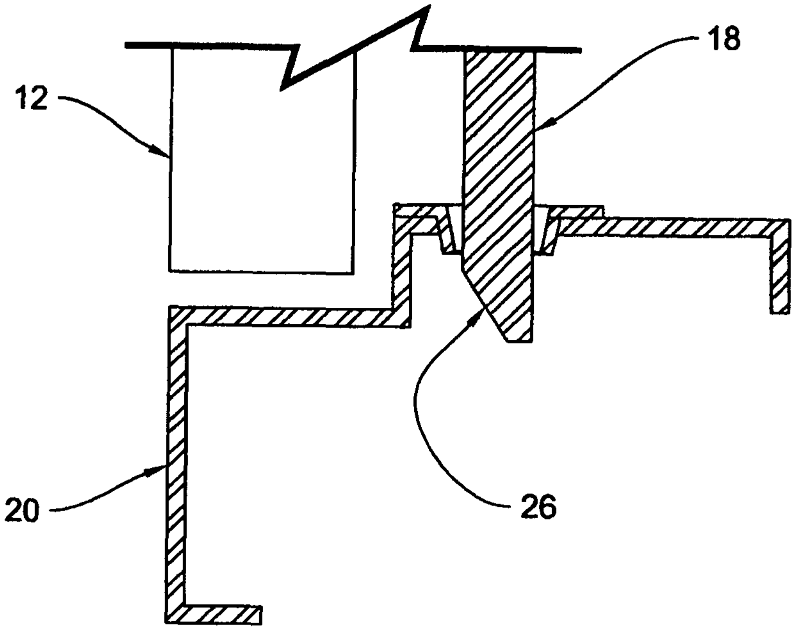
FIG. 11 is a cross sectional view taken along line 11-11 of FIG. 10.

As best seen in FIG. 9, a circular lock 58 engages lock hole 48. Recess 50 is adapted to engage circular lock 58 and thereby prevent movement of tab 47, and hence lower cam plate 32 and upper cam plate 34, when circular lock 58 in engaged with tab 47. Thus the entire body of circular lock 58 and recess 50 act to prevent movement from the locked position to the unlocked position until circular lock 58 is removed. Thus, movement of lower cam plate 32 and upper cam plate 34 and lock rod ends 16, 17 and 18 are not solely dependent upon the structural integrity of tab 47. A padlock

59 engages lock hole 53 and lock hole 55 in tabs 52 and 54, respectively, preventing movement of rod-locking link 41, and hence lower cam plate 32 and upper cam plate 34, preventing movement from the locked position to the unlocked position while padlock 59 is engaged. Recess 57 is partially covered by lock pocket cover 60 and lock pocket cap 61 preventing access to tabs 52 and 54 and padlock 59. Recess 50, lock pocket cover 60 and lock pocket cap 61 also provide weather protection for locking system 10.

Locking system 10 may alternately be made utilizing an elongated cover plate and back plate to create a recess, with handle 30 is replaced with a longer handle, which is mounted to the lower cam plate 32, and extends into the recess. A guard plate can allow the handle to be operated and prohibit access to the locking systems inner workings by potential thieves.

Although only certain embodiments have been illustrated and described, it will be apparent to those skilled in the art that various changes and modifications may be made therein without departing from the spirit of the invention or from the scope of the appended claims. For example, the present invention can be used in construction of new storage containers but also can be provided in a kit form for use in retrofitting existing storage containers.

What is claimed is:

1. A locking system for use with a storage container, the locking system being mounted into a door of the storage container, the locking system comprising:

a rod having a locked position extending beyond the periphery of the door and an unlocked position not extending beyond the periphery of the door, a handle rotatably engaging a lower cam plate, the handle operable to rotate the lower cam plate, which in turn operates an upper cam plate operatively engaged with the lower cam plate and the rod to move the rod from one of the locked position and the unlocked position to the other of the locked position and unlocked position, a locking tab extending from the lower cam plate, a secondary locking tab extending from a rod-locking link coupled to the upper cam plate; and a stationary locking tab positioned to be locked to the secondary locking tab by a pad lock.

2. The locking system of claim 1 further comprising a circular lock, wherein the locking tab includes a circular locking hole extending therethrough, wherein a hasp of the circular lock extends through the circular locking hole.

3. The locking system of claim 1 wherein the locking tab extends through an arcuate gap into a recess, wherein ends of the arcuate gap provide stops for the locking tab and the stops define the unlocked position and the locked position.

4. The locking system of claim 1, further comprising a housing mounted to and extending through the door, wherein:

the rod extends from the housing, the housing comprises a front panel having an integral flange, and the integral flange is adapted to flush mount to the exterior of the door with the housing extending inwardly therefrom.

5. The locking system of claim 1 wherein the handle rotatably engages an axle, the axle engages the lower cam plate, the lower cam plate engages a cam link, and the cam link engages the upper cam plate.

6. The locking system of claim 1 wherein the rod is coupled to the upper cam plate at a corner thereof.

7. The locking system of claim 6 wherein the rod is a top rod extending upwardly, the locking system further comprising a bottom rod extending downwardly and a side lock rod extending horizontally.

8. The locking system of claim 7 further comprising:

a side rod link coupled between the lower cam plate and the side lock rod; and a bottom rod link coupled between the lower cam plate and the bottom rod;

wherein the rod-locking link is coupled between the upper cam plate and the top rod.

9. The locking system of claim 7 further comprising rod guides mounted proximate to the periphery of the door, the rod guides adapted to align with the side lock rod, the top rod, and the bottom rod.

10. The locking system of claim 9 wherein the rod is thicker at the distal end thereof.

11. The locking system of claim 9 wherein all three of the lock rods must be compromised to gain access to the storage container.

12. The locking system of claim 1, wherein the rod is coupled to a rod link, the rod link coupled to a corner of the upper cam plate by a bushing.

13. The locking system of claim 12 wherein the rod link comprises a flat bar and the rod comprises a square bar.

14. The locking system of claim 1 wherein the rod includes a sloped edge adapted to facilitate alignment of the rod with a lock rod guide or door overlap.

15. The locking system of claim 1 wherein the rod is biased to the unlocked position.

16. The locking system of claim 1 comprising a housing mounted to and extending through the door, wherein the rod extends from the housing, the locking system further comprising anti-torque spacers interposed between the lower cam plate and the housing to maintain the lower cam plate and the housing in a parallel relationship.

17. A locking system for use with a storage container, the locking system being mounted to a door of the storage container, the locking system comprising:

a housing mounted to and extending through the door, a top rod extending upwardly from the housing and a bottom rod extending downwardly from the housing, a handle rotatably engaging an axle, the axle rotatably engaging a lower cam plate, the lower cam plate being operatively engaged with a cam link, the cam link being operatively engaged with an upper cam plate, the upper cam plate being operatively engaged with the top rod, and the lower cam plate being operatively engaged with the bottom rod, such that rotating the handle moves the top rod and the bottom rod between locked positions and unlocked positions, a locking tab extending from the lower cam plate into a first recess in the housing, and a secondary locking tab coupled to the locking tab via a combination of the upper cam plate, the cam link, and the lower cam plate, wherein the secondary locking tab extends extending into a second recess in the housing.

18. The locking system of claim 17 further comprising:

a top rod link coupled to a corner of the upper cam plate;

a bottom link coupled to a first corner of the lower cam plate; and a side rod link coupled to a second corner of the lower cam plate.

19. The locking system of claim 18 wherein the rod links and rods are comprised of solid bar and castings joined by welding.

20. The locking system of claim 18 further comprising rod guides mounted proximate to the periphery of the door, the rod guides adapted to align the rods.

21. The locking system of claim 17 wherein the rods are biased to the unlocked positions, further comprising:

a lock at the first recess; and a stationary locking tab at the second recess and configured to be locked to the secondary locking tab.

* * * * *